Patented Mar. 17, 1925.

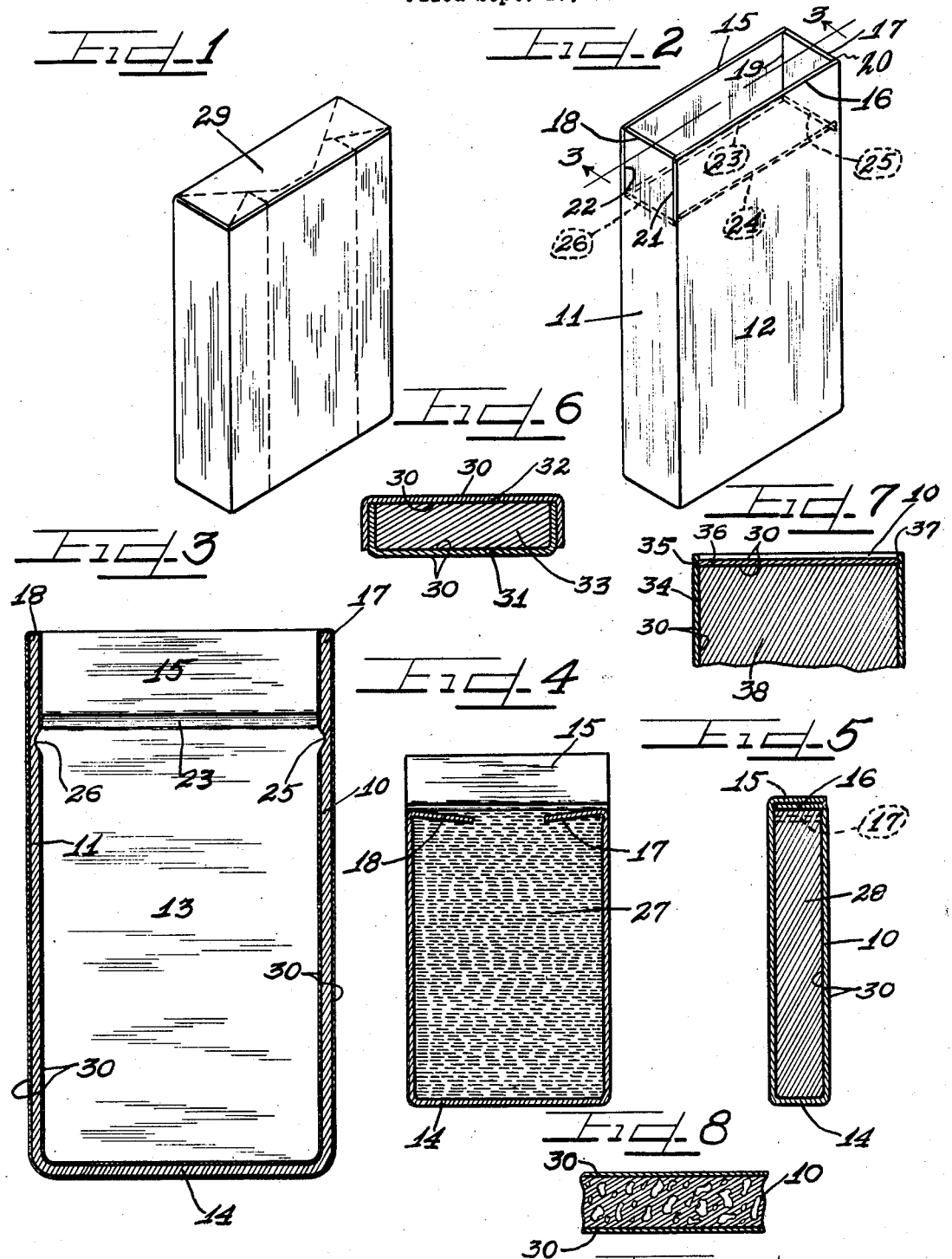

1,529,670

UNITED STATES PATENT OFFICE.

CASHIEL F. PRITCHARD AND AUGUSTINE F. NAYLOR, OF CHICAGO, ILLINOIS.

CONTAINER FOR FOOD PRODUCTS.

Application filed September 15, 1922. Serial No. 588,341.

*To all whom it may concern:*

Be it known that we, CASHIEL F. PRITCHARD and AUGUSTINE F. NAYLOR, both citizens of the United States of America, residing at Chicago, in the county of Cook and State of Illinois, have invented certain new and useful Improvements in Containers for Food Products. Our invention relates to containers for containing food products such as are commonly known as breakfast foods, ice cream, and the like.

The primary object of the invention is to provide a container for food products of an edible, alimentary, farinaceous glutinous or dextrinous material, such as wheat flour, for example.

A further object of the invention is to provide a container for food products, of such material that the container may itself be used as an article of food.

A further object of the invention is to provide a container for food products that will eliminate waste.

A further object of the invention is to provide a container for food products that will be economical in that it will eliminate the discarding of the container after the food products contained therein have been removed.

A further object of the invention is to provide a container for food products that will eliminate the use of a non-edible substance for the formation thereof.

Other objects of the invention will appear from the following specification directed to the preferred embodiment of the invention and depicted in the drawings forming a part of the specification, and finally, more particularly pointed out in the appended claims.

In the packaging of food products as at present practiced, it is the custom to provide a tin or pasteboard container having a waterproof lining consisting of a paraffined or oiled paper to protect the contents of the package from dampness. Then, after filling the container with merchandise, such as are commonly known as breakfast foods, for example, the container is sealed, and a second or additional waterproofing material, such as paraffin or oiled paper, is placed around the outside of the filled container, having its seam sealed to further protect the contents of the package from moisture and contamination.

In our food container for package goods we make the container proper of a baked or dried edible, alimentary, farinaceous glutinous or dextrinous material, such as wheat flour, for example, though any other suitable edible substance may be employed. After the container proper is properly baked or dried, it is given an inner and outer coating of any suitable waterproofing material, such, for example, as oleo-sterin or casein product, which protects the contents of the container from moisture. When the improved container as described is filled and sealed, as hereinafter described, a waterproofed wrapper of any suitable material may be placed around the container to protect it from contamination by dust or the like.

The great advantage of making the container proper as described lies in the fact that the container not only serves as a container for the food contained therein, but may be utilized as a food itself. For example, the container may be made of dough, and after the food has been removed from the container the container may be broken up and used as noodles, thus resulting in a great saving to the packer of the goods in the elimination of the cost of the pasteboard container and the inner waterproof lining. Both of these articles are becoming more and more expensive, as they are both made from paper pulp, the material for the manufacturing of which is becoming more and more scarce as time goes on.

While the invention may be employed in the manufacture of containers of many and various kinds for containing many and various kinds of food products, we have shown in the drawings and described in the specification the invention as applied to containers for ice cream.

In the drawings Fig. 1 is a perspective view of the improved food container encased in an outside wrapper.

Fig. 2 is a perspective view of the improved container showing the closure members or flaps in open position.

Fig. 3 is a central vertical sectional view taken on line 3—3 Fig. 2, looking in the direction of the arrows.

Fig. 4 is a view similar to Fig. 3 showing the container filled with ice cream and having two of the closure flaps bent downwardly and partially embedded in the ice cream, the ice cream being in a semi-frozen state.

Fig. 5 is a vertical sectional view of the improved container filled with ice cream in a frozen state with all four of the closure members or flaps in closed position.

Fig. 6 is a vertical sectional view of a modified form of the improved container filled with ice cream with the cover thereon.

Fig. 7 is a vertical sectional view of another modified form of the container showing the container as filled with ice cream, a portion of the container being broken away.

Figure 8 is a section of a fragment of a container wall.

In the application of the invention as applied to containers for ice cream, reference characters 10, 11, 12 and 13 indicate the walls of the container proper having bottom 14. The container is provided at its upper end with folding members or flaps 15, 16, 17 and 18, which are formed by slitting or kerfing the material of which the container is made downwardly as at its four respective corners 19, 20, 21 and 22. Slits or kerfs 19 and 22 extend downwardly to the approximate center of the transverse groove 23 formed in the wall 13 of the container, while slits or kerfs 20 and 21 extend downwardly to the approximate center of the groove 24 formed in the wall 12 of the container. Groove 23 lies in a horizontal plane immediately above the horizontal plane of groove 24 in wall 12, in order that when closure member or flap 16 is folded inwardly enclosing the container, closure member or flap 15 may be folded over closure member or flap 16 and lie flat thereupon. Walls 10 and 11 have grooves 25 and 26 on their respective inner faces, these grooves preferably lying in the same horizontal plane and immediately below the bottom side of groove 24 in wall 12, in order that closure members or flaps 17 and 18 may not interfere with the folding inwardly of the closure members or flaps 15 and 16 thereover, thus providing for the non-interference of the closure members or flaps with each other when folding to closed position, and producing a neat and smooth closure for the container. The entire inner and outer surfaces of the container, with the exception of the inner surfaces of the grooves 23, 24, 25 and 26 is provided with a coat of waterproofing substance 30, such, for example, as oleo-sterin or casein product, to exclude dampness from the material within the container. The inner surfaces of the grooves 23, 24, 25 and 26 are not covered with the waterproofing material in order that they may be moistened in any suitable way to render the walls of the container pliable at this point and facilitate the folding of the closure members or flaps inwardly without cracking or breaking at the point of folding.

In the use of our improved container for ice cream as described, the ice cream may be introduced into the container in a semi-frozen state as indicated by reference character 27, Fig. 4, the closure members or flaps 17 and 18 then bent inwardly and downwardly, slightly embedding the ends of these closure members or flaps in the ice cream 27, when closure member or flap 16 is bent inwardly and downwardly upon closure members or flaps 17 and 18, and finally closure member or flap 15 is folded inwardly and downwardly upon closure member or flap 16, thus completely and effectively closing the container when, if desired, the closure members or flaps may be sealed in closed position in any suitable manner. The container with the semi-solid ice cream therein is then subjected to a freezing temperature and the semi-solid ice cream therein frozen, as indicated by reference character 28, Fig. 5, and the outside waterproof wrapper 29 placed therearound. In this application of our invention it will be found that the semi-frozen ice cream will sufficiently moisten the inner surfaces of grooves 23, 24, 25 and 26 to render them pliable, when they will readily fold inwardly without cracking or breaking at the point of folding. In Fig. 6 is shown a modified form of the invention which comprises a box-like structure 31 having cover 32, which are made of an edible, alimentary, farinaceous, glutinous or dextrinous material such, for example, as wheat flour. The inner and outer surfaces of the box-like structure and the cover are provided with a waterproofing substance 30 such, for example, as oleo-sterin or casein product. Within the box-like structure is indicated a block 33 of ice cream.

This form of the improved container is particularly adapted to the dispensing of ice cream in small quantities by dealers who provide themselves with the containers and fill them with the ice cream, then placing the cover on the container and delivering it to the purchaser. Ice cream dispensed in this way is virtually in the form of what is known as an ice cream sandwich, though it has the advantage of confining the ice cream within the container and preventing the dripping of the ice cream therefrom while the sandwich is being eaten.

In Fig. 7 we have shown another modified form of our improved container for ice cream, which comprises a box-like structure 34, the side walls of which have a groove or indentation 35 on the inner faces and adjacent the upper extremity thereof for the reception therein of cover 36. In this form of the invention the container and cover are made of an edible, alimentary, farinaceous, glutinous or dextrinous material having a waterproof lining 30 on the inner and outer faces of the walls and cover of the container. The side walls of the container are beveled or sloped as at 37 to facilitate in the centering and snapping in place of the cover 36, to completely encase the ice cream block 38. This form of the container, like the form shown in Fig. 6, is also particularly adapted to the use of dealers in dispensing small quantities of ice cream.

The structure of the material for forming the container is preferably made cellular or sponge-like, as clearly shown in Fig. 8, thereby causing the walls of the container to act as heat insulators. The formation of this cellular or sponge-like material may be accomplished by mixing with the dough for forming the container a suitable quantity of any material which will form a gas when subjected to heat, such as bicarbonate of soda, for example. The cells or pockets thus formed in the walls of the material of which the container is formed causes the walls thereof to act as heat insulators, and materially aid in maintaining ice cream, for example, within the container in a frozen state for a considerable length of time. While it is not desired to be limited to any specific composition for making the dough to be dried or baked in our improved container, as same may be varied over a wide range of compositions to adopt our invention for different food products, the preferred formulæ which we employ in making a container for ice cream and other frozen products is as follows:

98 lbs. Northern wheat flour, 10 lbs. of sugar, 8 ounces sodium bicarbonate and one dozen eggs mixed together with sufficient liquid as water or milk to form a batter or dough for drying or baking and which may be flavored in the mixing if desired by the addition of a suitable quantity of flavoring material as vanilla extract.

Having thus described our invention what we claim is:

1. A container for food products formed of baked edible material and comprising an open ended body having integrally formed extension portions adapted to be folded to close said body.

2. As a new article of manufacture, a container formed of baked edible material and comprising a body and a closure member integral therewith, said closure member being adapted to be folded when moistened and becoming rigid upon drying.

3. As a new article of manufacture, a container for food comprising an edible material formed to provide a body to receive a portion of food and a closure for said body integral therewith, baked until solid and brittle and then coated with a waterproof material, said closure member being provided with an uncoated section for the application of moisture thereto preparatory to folding said closure member over said body.

In testimony whereof we have signed our names to this specification this 6th day of September A. D. 1922.

CASHIEL F. PRITCHARD.
AUGUSTINE F. NAYLOR.